United States Patent [19]

Hibyan

[11] 3,802,798

[45] Apr. 9, 1974

[54] ROTOR BLADE CAPTURING ASSEMBLY

[75] Inventor: Edward S. Hibyan, Trumbull, Conn.

[73] Assignee: The United States of America as represented by the Secretary of the Air Force, Washington, D.C.

[22] Filed: Jan. 30, 1973

[21] Appl. No.: 328,158

[52] U.S. Cl. ................................ 416/143, 416/153
[51] Int. Cl. ........................................... B64c 11/28
[58] Field of Search ............ 416/143, 153, 142, 132

[56] References Cited
UNITED STATES PATENTS

| 2,464,285 | 3/1949 | Andrews | 416/143 |
| 2,497,040 | 2/1950 | Williams | 416/143 |
| 2,815,820 | 12/1957 | Papadakos | 416/143 |
| 3,133,715 | 5/1964 | Grunfelder | 416/143 X |
| 3,744,742 | 7/1973 | Gear | 416/142 X |
| 3,750,982 | 8/1973 | Gear | 416/142 X |

FOREIGN PATENTS OR APPLICATIONS

| 1,091,401 | 11/1967 | Great Britain | 416/142 |
| 419,780 | 4/1947 | Italy | 416/143 |

Primary Examiner—Everette A. Powell, Jr.

[57] ABSTRACT

A fail-safe assembly for releasably capturing and holding rigidly in a folded position the sections of a two-section foldable rotor blade of a rotary wing-type aircraft, such as a convertible aircraft, while the aircraft is in forward flight and irrespective of the pitch of the rotor blade. The assembly includes a male member attached to the trailing edge of the outboard section of the rotor blade; a complementary female member attached to the trailing edge of the inboard section of the rotor blade; and, means for permitting the releasable capture of the male member within the female member. Optionally, but preferably, the assembly also includes means, operatively associated with the female member, for sensing and for indicating at a remote location, such as the cockpit of the convertible aircraft, that the male member has been releasably captured within the female member. The operation of the capturing assembly is reversible.

4 Claims, 3 Drawing Figures

ROTOR BLADE CAPTURING ASSEMBLY

BACKGROUND OF THE INVENTION

This invention relates to an aircraft, such as a helicopter or a convertiplane, which has as a motive component thereof one or more essentially horizontal rotating blades (hereinafter referred to as "rotor blades" or "blades") and, more particularly, to such a rotary wing type aircraft wherein each rotor blade is foldable into two sections, i.e., an inboard section and an outboard section.

As a preliminary matter, it is to be noted that foldable rotor blades are well known in the art. The folding of foldable rotor blades has proved to be tremendously advantageous in many ways, especially in parking, storing, and shipping the rotary wing type aircraft of which the foldable rotor blades are a motive component.

On the other hand, it is to be noted that it is equally well known in the art that what is needed, and is not available, is a completely reliable (i.e., fail-safe) and aerodynamically efficient means for folding the rotor blades while the rotary wing type aircraft is in forward flight.

Since the process of folding rotor blades in forward flight produces unavoidable blade flexing which makes the capturing procedure difficult to accomplish, a functionally reliable blade capturing mechanism (i.e., assembly) to capture the folded half of each blade and to secure it rigidly at the inboard end is required.

I have invented such a much-needed mechanism; and, thereby, I have significantly advanced the state-of-the-art.

SUMMARY OF THE INVENTION

This invention pertains to folding rotor blades.

The principal object of this invention is to provide a much-needed fail-safe mechanism, in the form of an assembly, for releasably capturing and holding rigidly in a folded position the sections of a two-section foldable rotor blade of a rotary wing-type aircraft, while said aircraft is in forward flight and irrespective of the pitch of the rotor blade.

This object, and other equally important and related objects, of this invention will become readily apparent after a consideration of the description of the invention, coupled with reference to the drawings.

My invention, as hereinafter shown and described, is in the form of a preferred embodiment adapted for use on and with a convertiplane. This is by way of illustration only, an not by way of any limitation.

DESCRIPTION OF THE PREFERRED EMBODIMENT

Figure 1:
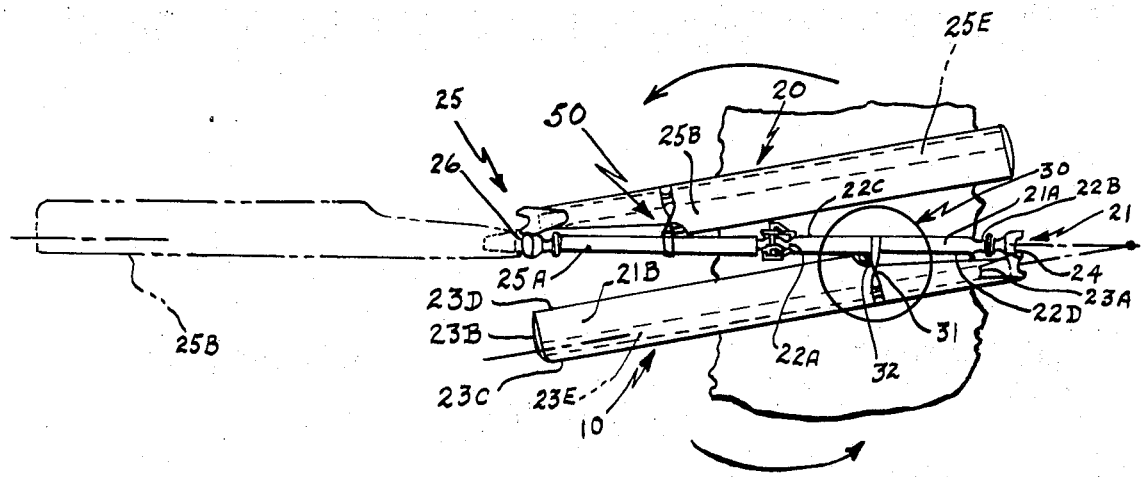
FIG. 1 is a top plan view, in simplified schematic form, of a two bladed rotor of a rotary wing-type aircraft, such as a convertiplane, which has identical representative foldable rotor blades and which incorporates a preferred embodiment of my invention as adapted for use on and with a convertiplane, with said view also showing in phantom the fully extended position of one of the representative rotor blades: blades.

With reference to FIG. 1, therein is shown, in a top plan view and in simplified schematic form, a two bladed rotor assembly 20 of a rotary wing-type aircraft 10, such as a convertible aircraft, hereinafter referred to as a "convertiplane" (shown in FIG. 1 as a fragmented portion, in the interest of maintaining simplicity of the drawing), which said assembly 20 incorporates a preferred embodiment of my invention that is generally designated in FIG. 1 by reference numeral 30 and is encircled for easy identification and reference.

Rotor assembly 20 includes, but is not limited to, representative foldable rotor blades 21 and 25 which are identical. Foldable rotor blade 21 comprises two segments or sections, an inboard section 21A and an outboard section 21B. The inboard section 21A has a first end 22A and a second end 22B, and a leading edge 22C and a trailing edge 22D. Likewise, the outboard section 21B has a irst end 23A and a second end 23B, and a leading edge 23C and a trailing edge 23D. Internal of, and integral to, outboard section 21B is blade spar 23E. The second end 22B of inboard section 21A and the first end 23A of outboard section 21B are hingedly connected, by suitable conventional means such as 24, whereby foldable blade 21 is foldable at the hinged connection 24 in a position counter to the direction of rotation. In this regard, it is to be noted that the rotor blades 21 and 25 rotate in the direction designated by the arrows in FIG. 1 (i.e., counterclockwise). It is also to be noted that when foldable blade 21 is unfolded completely (i.e., when it is fully extended), leading edge 22C of inboard section 21A and leading edge 23C of outboard section 21B face in the same direction and also in the direction of the rotation. However, when blade 21 is folded at hinge connection 24, the trailing edge 22D of inboard section 21A and the trailing edge 23 D of outboard section 21B are adjacent and face each other.

As a related matter, and still with reference to FIG. 1, the representative foldable rotor blade 25 comprises two segments or sections, an inboard section 25A and an outboard section 25B (with blade spar 25E) which fold and unfold, selectively and when desired, at hinged connection 26. As previously stated, it is emphasized that representative foldable rotor blade 25 is identical to representative foldable rotor blade 21 which, in turn, already has been described in detail heretofore. Also shown in FIG. 1, in phantom however, is foldable rotor blade 25 in a completely unfolded (i.e., fully extended) condition. Of course, identical representative foldable rotor blade 21 is similarly foldable or extendable. Further, it is to be noted that the retraction ratio is, as a matter of preference, 3 to 1. Stated another way, when the representative foldable rotor blades 21 and 25 are fully retracted (i.e., completely folded), the length of the inboard sections, such as 21A and 25A, each are one third of the fully extended length of their particular foldable rotor blade. Obviously, their outboard sections, such as 21B and 25B, are twice the length of the respective inboard sections, and are two thirds of the length of the fully extended particular foldable rotor blade.

Still with reference to FIG. 1, and encircled for easy identification, is a preferred embodiment of my invention 30, an assembly for releasably capturing and holding rigidly in a folded position the sections, such as 21A and 21B, of a two-section foldable rotor blade, such as 21, of a rotary wing-type aircraft, such as a convertiplane 10. In essence, my invention assembly 30, as adapted for use with representative foldable rotor blade 21, comprises essentially a male member 31, a complementary female member 32, and means for permitting the releasable capture of the male member 31 within the female member 32. The male member 31 is attached to the trailing edge, such as 23D, of the outboard section, such as 21B, of the foldable rotor blade, such as 21, at a first preselected distance from the first end, such as 23A, of the outboard section 21B. More specifically, and preferably, the male member 31 is attached also to the blade spar 23A of outboard section 21B. The complementary female member 32 is attached to the trailing edge, such as 22D, of the inboard section, such as 21A, at a second preselected distance from the second end, such as 22B, of the inboard section 21A, with the second preselected distance equal to the first preselected distance, and with the female member 32 configurated and dimensioned to accept the male member 31. An assembly 50, identical to my inventive assembly 30, for use with representative foldable rotor blade 25, is also shown in FIG. 1, but is not described per se herein to avoid repetition.

Figure 2:
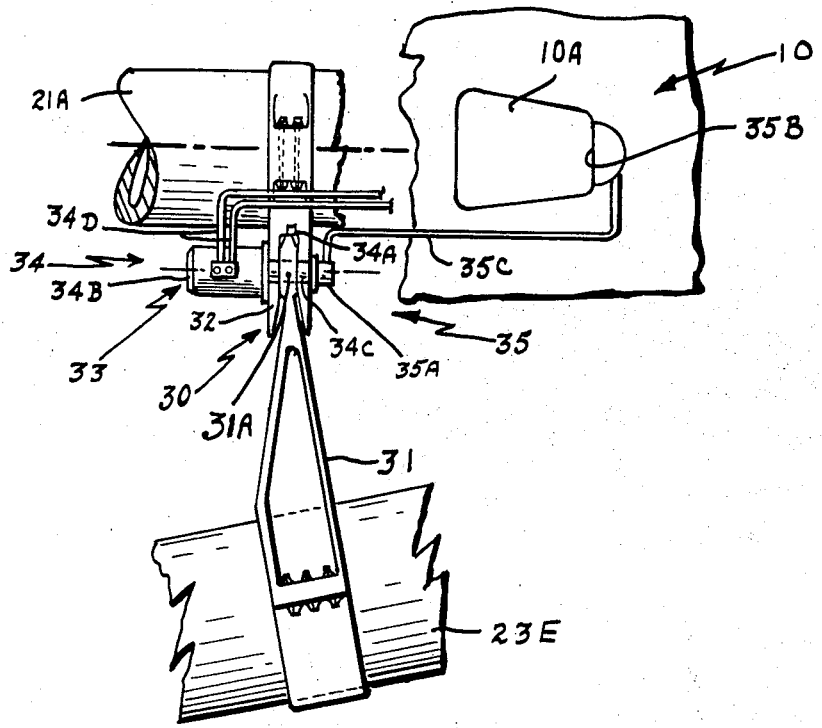
FIG. 2 is a top plan view, in simplified schematic form, enlarged and in detail, but not to scale, and partially fragmented, of the preferred embodiment of my invention, as shown encircled in FIG. 1.

Now, with reference to FIG. 2 therein is shown, in a top plan view and in simplified schematic form, enlarged and in detail, but not to scale, and partially fragmented, the preferred embodiment 30 of my inventive assembly, which is encircled in FIG. 1 for easy identification and reference.

The male member or probe member 31 of my inventive assembly 30 is, as a matter of preference, a probe arm which has a hole 31A transversely positioned therethrough. In FIG. 2, the probe arm 31 is shown in the releasably captured and secured (i.e., locked) position, accepted by, and within the cmplementary female member or probe receptacle 32 (i.e., the bellmouth receptacle).

An embodiment of a means component of my invention 30, for permitting the releasable capture of the male member 31 (i.e., the probe arm) within the complementary female member 32 (i.e., the probe receptacle) is also shown in FIG. 2, and is generally designated by reference numeral 33. Said means 33, includes as shown in FIG. 2, but is not limited to, a locking (and unlocking) pin drive subassembly 34 which, in turn, includes: a first suitable conventional sensor 34A, attached to the probe receptacle 32, for sensing and for emitting a signal when probe arm 31 is accepted by, and is positioned within, probe receptacle 32; an actuator 34B, also attached to the probe receptacle 32; a movable locking pin 34C operatively associated with actuator 34B and sized to fit into and through probe arm hole 31A; and, actuator lines 34D for detecting and for transmitting the signal emitted by first sensor 34A, with said actuator lines connected to the actuator 34B.

Still with reference to FIG. 2, therein is shown means for sensing, and for indicating at a remote location, that probe arm 31 (i.e., the male member) has been accepted by the probe receptacle 32 (i.e., the complementary female member) and is in a releasably captured and secured (i.e., locked) position within probe receptacle 32. A preferred embodiment of such a means is generally designated 35 and includes: a second suitable conventional sensor 35A, attached to probe receptacle 32, for sensing and for emitting a signal when probe arm 31 is, in fact, releasably captured and locked within probe receptacle 32; a display 35B at the desired remote location, such as cockpit 10A of convertiplane 10, for indicating th releasable capture of probe arm 31 within probe receptacle 32; and, sensor lines, such as 35C, connecting second sensor 35A to display 35B, so as to relay or to convey (i.e., transmit) the signal emitted by and from the sensor 35A to the display 35B at the desired remote location.

Figure 3:
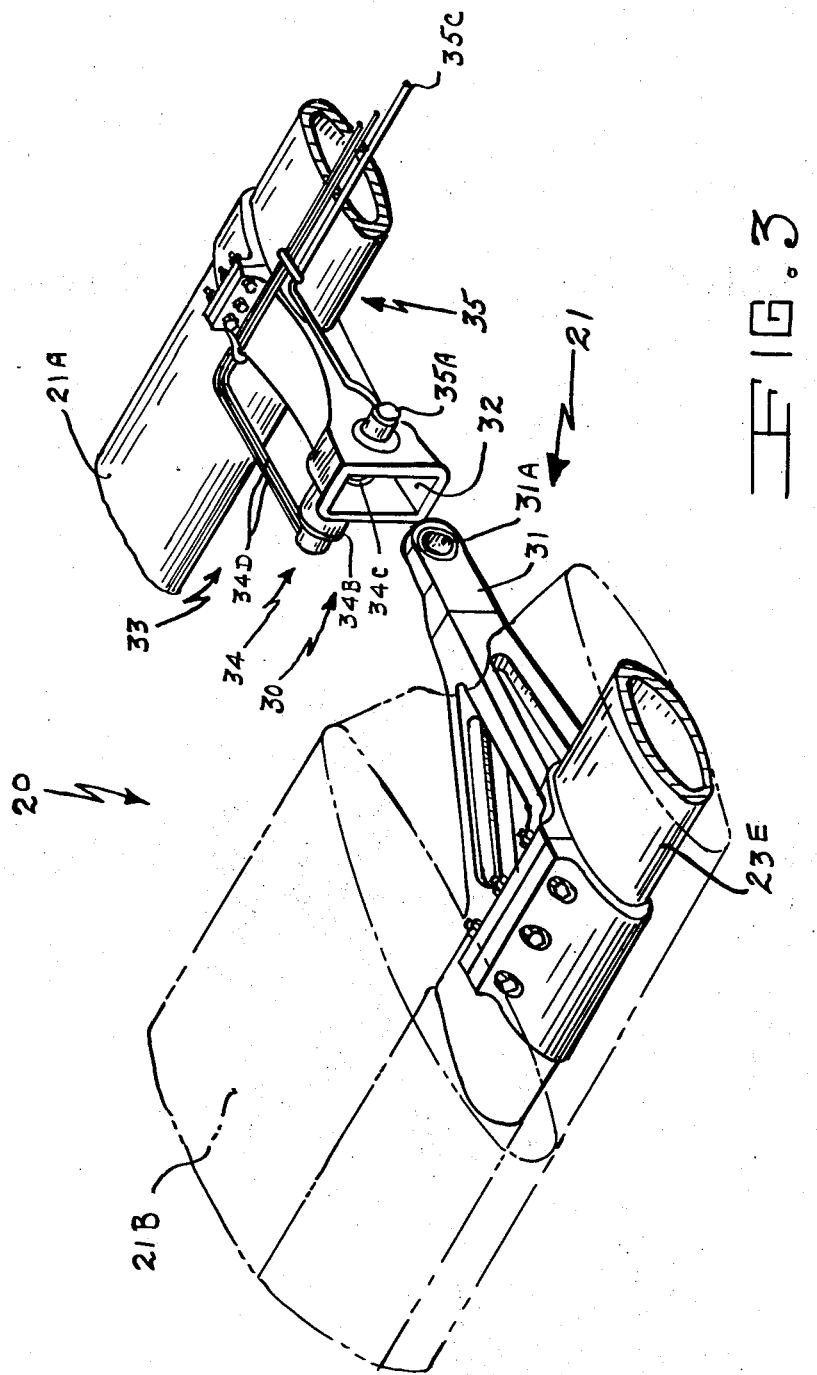
FIG. 3 is a side elevation view, in perspective and partially fragmented of my invention, immediately prior to the capture and/or release of the outboard section of one of the rotor blades.

With reference to FIG. 3, therein is shown, in a side elevation view, in perspective, and partially fragmented, the preferred embodiment 20 of my invention, immediately prior to the releasable capture of the outboard section 21B of representative foldable rotor blade 21. More specifically, shown therein are: a portion of inboard section 21A of foldable rotor blade 21, with probe receptacle 32 of my inventive releasable capture assembly 30 attached thereto; means 33 for permitting the releasable capture of probe arm 31, including locking pin driving subassembly 34; actuator 34B of subassembly 34 attached to probe receptacle 32B; movable locking pin 34C of subassembly 34; actuator lines 34D of subassembly 34; means 35 for sensing and for indicating at a remote location that probe arm 31 is in a releasably captured and locked position within probe receptable 32; second sensor 35A attached to probe receptacle 32, and sensor lines 35C, which said second sensor 35A and lines 35B are rotor blade of means 35; outboard section 21B of foldable blade 21, with blade spar 23E thereof; and, probe arm 31, as already indicated, with transversely positioned hole 31A therethrough, and with probe arm 31 attached to the outboard section 21B and spar 23E thereof.

MANNER OF OPERATION OF THE PREFERRED EMBODIMENT

The manner of operation of the preferred embodiment 30 of my invention is easily understood from the foregoing description, coupled with reference to FIGS. 1–3, inclusive.

Succinctly, and in essence, as a result of the folding of the rotor blades, such as 21, of the convertiplane, such as 10, by suitable conventional means which are well known in the art (and which are not shown since said means do not form any part of my invention), probe arm 31 enters into, and is accepted by, complementary probe receptacle 32 and contacts first sensor 34A of my locking (and unlocking) pin drive subassembly 34 of my means for releasably capturing the male member (i.e., the probe arm 31) within the complementary female member (i.e., th probe receptacle 32). The first sensor 34A then emits a signal, or otherwise "triggers," the actuator 34B of the pin drive subassembly 34 by, or through, suitable means, such as signal responsive actuator lines 34D. As a result, movable locking pin 34C is actuated, moves, and is driven through probe arm hole 31A. Thereby, probe arm 31 is releasably captured and locked (i.e., secured) within probe receptacle 32. Of course, concurrently, due to structural integration, outboard section 21B and inboard section 21A of representative foldable rotor blade 21 are also releasably captured; and, in addition, said sections 21A and 21B are held rigidly in the completely folded position.

Then, second sensor 35A of my sensing and remote indicating means 35 emits a signal which is transmitted or conducted through sensor lines 35C to display 35B, which is at the desired remote location, such as cockpit 10A of convertiplane 10. Display 35B indicates that probe arm 31 has, in fact, been releasably captured and secured within probe receptacle 32. An observer at the remote location, such as the pilot of the convertiplane 10, is thereby advised of the releasable capture and of the locked condition of the inboard section 21A and of the outboard section 21B of foldable rotor blade 21.

The entire operation is, of course reversible.

CONCLUSION

It is clear from the foregoing description, and from the drawings herein, that the principal object, and other related objects, of my invention have been attained.

In addition, while there have been shown and described the fundamental unique features of my invention, as applied to a particular preferred embodiment adapted for use with a convertiplane, it is to be understood that various other embodiments, substitutions, additions, omissions, adaptations, and the like, can be made by those of ordinary skill in the art, without departing from the spirit of the invention.

What I claim is:

1. An assembly for releasably capturing and holding rigidly in a folded position the sections of a two-section foldable rotor blade of a rotary wing-type aircraft, wherein said two-section foldable blade has an inboard section with a first and second end, and wherein said blade has an outboard section with a first and second end, and wherein said inboard section and said outboard section each has a leading edge and a trailing edge, and wherein said second end of said inboard section and said first end of said outboard section are hingedly connected, with the leading edge of each said section facing in the same direction and in the direction of rotation, and wherein said blade is foldable, at said hinged connection, counter to the direction of rotation, and wherein said trailing edge of said inboard section and said trailing edge of said outboard section are adjacent when said blade is folded, comprising:
   a. a male member attached to the trailing edge of said outboard section at a first preselected distance from said first end of said outboard section;
   b. a complementary female member attached to the trailing edge of said inboard section at a second preselected distance from said second end of said inboard section, with said second preselected distance equal to the aforesaid first preselected distance, and with said female member configurated and dimensioned to accept said male member;
   c. and, means for permitting the releasable capture of said male member within said female member;
   whereby said male member and said female member, and the outboard section to which said male member is attached, and the inboard section to which said female member is attached, are held rigidly in a folded position after said acceptance and said releasable capture;
   and, whereby said male member and the outboard section to which it is attached, and said female member and the inboard section to which it is attached, may be selectively released from said capture.

2. The assembly, as set forth in claim 1, wherein said male member is in the form of a probe arm having a hole transversely positioned therethrough, and wherein said means for permitting the releasable capture of said male member within said complementary female member includes a locking, and unlocking, pin drive subassembly which, in turn, includes: a first sensor, attached to said female member, for sensing, and for emitting a signal, when said probe arm is accepted by said female member; an actuator attached to said female member; a movable locking pin operatively associated with said actuator, and sized to fit into and through said probe arm hole; and, actuator lines, responsive to the signal emitted by said first sensor, for detecting and transmitting the signal emitted by said first sensor, with said actuator lines being connected to said actuator; wherein, said actuator moves, and removably inserts, said locking pin into siad transversely positioned probe arm hole, whereby said probe arm is releasably captured within said female member.

3. The apparatus, as set forth in claim 1, which further comprises means, operatively associated with said complementary female member, for sensing, and for indicating at a remote location, that said male member has been accepted by said female member and has been releasably captured within said female member by said releasable capturing means, and for sensing, and for indicating at a remote location, that said male member has been released from capture within said female member by said releasable capturing means.

4. Sensing and indicating means, as set forth in claim 3, wherein said means includes: a second sensor, attached to said complementary female member, for sensing and for emitting a signal when said male member is releasably captured within said female member by said releasable capturing means; a display at the desired remote location for indicating the releasable capture of said male member within said female member; and, sensor lines connecting said second sensor to said display, whereby the signal emitted by and from said second sensor is conducted to said display.

* * * * *